United States Patent Office 3,052,692
Patented Sept. 4, 1962

3,052,692
BETA,DELTA-DIMETHYL-BETA,GAMMA-EPOXY-DELTA-HEXANOLACTONE
Benjamin Phillips and Paul S. Starcher, Charleston, W. Va., assignors to Union Carbide Corporation, a corporation of New York
No Drawing. Filed Nov. 15, 1960, Ser. No. 69,287
1 Claim. (Cl. 260—343.5)

The present invention relates to a new composition of matter, beta-delta-dimethyl-beta,gamma-epoxy-delta-hexanolactone which has been found suitable for use as a polyfunctional monomer in condensation resins such as epoxy resins and polyesters and as a plasticizer for polyvinyl resins.

The compound of the present invention can be represented by the following structural formula:

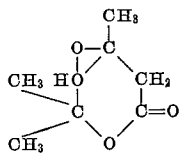

Beta,delta - dimethyl - beta,gamma - epoxy-delta-hexanolactone is readily prepared by reaction of beta,delta-dimethyl-$\Delta^{beta,gamma}$, delta-hexenolactone and a peracid at temperatures of from about −10° C. to about 85° C.

The amount of peracid employed to produce the epoxide is not a critical feature of the invention. Stoichiometric to excess quantities can be employed as desired. It is preferred to employ an excess of peracid to insure complete epoxidation and drive the reaction to completion.

The peracids which have been found suitable for use include peracetic acid, perbenzoic acid, monoperphthalic acid and the like. Peracetic acid, however, is preferred because of its ready availability and low cost.

After the reaction is complete the product can be worked up in any desired manner and subjected to further purification procedures if desired, however, it is not necessary.

As heretofore pointed out the novel compound of this invention can be used in a variety of ways. It can be reacted with polyamines or dicarboxylic acids to produce resins which are useful as coating compositions. The novel compound of this invention can also be used as a plasticizer for polyvinyl chloride.

The following example will illustrate the practice of the invention.

To 140 grams of beta,delta-dimethyl-$\Delta^{beta,gamma}$, delta-hexenolactone was added dropwise 568 grams of a 20.1 percent solution of peracetic acid in acetone over a period of 1.3 hours. After 0.5 hour the temperature was raised to 50° C. After the addition was complete the mixture was stirred for 4 hours at 50° C. at which time 92 percent of the theoretical amount of peracetic acid had been consumed. The volatiles were removed by co-distillation with ethylbenzene leaving a solution of the epoxylactone in ethylbenzene. The epoxylactone crystallized and was filtered to yield 135 grams (87 percent yield) of white crystals, melting point 77–79° C. Two recrystallizations from ethyl acetate gave pure beta,delta-dimethyl - beta,gamma-epoxy-delta-hexanolactone having the following properties:

|  |  | Calculated Values |
|---|---|---|
| Melting point 78.5–80°C. |  |  |
| Saponification equivalent | 154 | 156 |
| Percent Carbon | 61.65 | 61.5 |
| Percent Hydrogen | 7.68 | 7.69 |
| Molecular weight | 156±3 | 156 |

The infrared spectrum was consistent with the epoxylactone structure.

This application is a continuation-in-part of application Serial No. 778,598, filed December 8, 1958, now abandoned.

What is claimed is:

Beta,delta - dimethyl - beta,gamma - epoxy-delta-hexanolactone.

No references cited.